United States Patent
Gustafsson et al.

(10) Patent No.: US 10,803,725 B2
(45) Date of Patent: Oct. 13, 2020

(54) MEANS AND METHOD FOR DETECTING THE PRESENCE OF AT LEAST ONE OBJECT TO BE TIDIED IN A WASHROOM

(71) Applicant: SCA Hygiene Products AB, Gothenburg (SE)

(72) Inventors: Anders Gustafsson, Gothenburg (SE); Eva-Li Saarväli, Västra Frölunda (SE); Urban Gabrielsson, Kärna (SE)

(73) Assignee: ESSITY HYGIENE AND HEALTH AKTIEBOLAG, Gothenburg (SE)

(*) Notice: Subject to any disclaimer, the term of this patent is extended or adjusted under 35 U.S.C. 154(b) by 301 days.

(21) Appl. No.: 15/835,783

(22) Filed: Dec. 8, 2017

(65) Prior Publication Data

US 2018/0102040 A1 Apr. 12, 2018

Related U.S. Application Data

(62) Division of application No. 14/238,409, filed as application No. PCT/EP2011/064286 on Aug. 19, 2011, now Pat. No. 9,875,634.

(51) Int. Cl.
*G01C 3/08* (2006.01)
*G08B 21/18* (2006.01)
(Continued)

(52) U.S. Cl.
CPC ............. *G08B 21/18* (2013.01); *G01S 7/52* (2013.01); *G01S 15/02* (2013.01); *G01S 17/04* (2020.01); *G08B 21/245* (2013.01)

(58) Field of Classification Search
CPC ......... G08B 21/18; G08B 21/245; G01S 7/52; G01S 15/02; G01S 17/026
See application file for complete search history.

(56) References Cited

U.S. PATENT DOCUMENTS

| 5,613,261 A | 3/1997 | Kawakami et al. |
| 5,808,728 A | 9/1998 | Uehara |

(Continued)

FOREIGN PATENT DOCUMENTS

| CN | 1354073 A | 6/2002 |
| CN | 1489702 A | 4/2004 |

(Continued)

OTHER PUBLICATIONS

International Search Report (PCT/ISA/210) dated Mar. 28, 2012, by the European Patent Office as the International Searching Authority for International Application No. PCT/EP2011/064286.

(Continued)

*Primary Examiner* — Samantha K Abraham
(74) *Attorney, Agent, or Firm* — Buchanan Ingersoll & Rooney PC (57) ABSTRACT

A method and apparatus for determining presence of an object to be tidied in a washroom. A beam is supplied to a surface of the washroom at a first location. A reflected beam received from the surface of the washroom or received from an object in the path of the beam to the surface is detected. The presence of the object is determined from feedback from the beam based on a comparison of the feedback with a detection result when the beam reflects from the surface at the first location. An object to be tidied output signal is issued indicating that an object to be tidied is present based on the determination on the presence of an object.

17 Claims, 3 Drawing Sheets

(51) Int. Cl.
  *G01S 17/04* (2020.01)
  *G01S 7/52* (2006.01)
  *G01S 15/02* (2006.01)
  *G08B 21/24* (2006.01)

(56) References Cited

U.S. PATENT DOCUMENTS

| | | | |
|---|---|---|---|
| 6,459,955 | B1 | 10/2002 | Bartsch et al. |
| 6,496,754 | B2 | 12/2002 | Song et al. |
| 7,990,550 | B2 | 8/2011 | Aebischer et al. |
| 2002/0091466 | A1 | 7/2002 | Song et al. |
| 2004/0088079 | A1 | 5/2004 | Lavarec et al. |
| 2005/0171634 | A1 | 8/2005 | York et al. |
| 2006/0005312 | A1 | 1/2006 | Reddy et al. |
| 2012/0113410 | A1 | 5/2012 | Iwasawa et al. |

FOREIGN PATENT DOCUMENTS

| | | | | |
|---|---|---|---|---|
| CN | 101142496 A | 3/2008 | | |
| EP | 1 703 300 A1 | 9/2006 | | |
| GB | 2 395 891 A | 6/2004 | | |
| JP | 60-089784 A | 5/1985 | | |
| JP | 2011-022080 A | 2/2011 | | |
| WO | WO 93/03399 A1 | 2/1993 | | |
| WO | WO-9303399 A1 * | 2/1993 | ........... | G01S 17/026 |
| WO | 99/04283 A1 | 1/1999 | | |
| WO | WO 2005/065509 A1 | 7/2005 | | |
| WO | WO 2006/065514 A1 | 6/2006 | | |

OTHER PUBLICATIONS

Written Opinion (PCT/ISA/237) dated Mar. 28, 2012, by the European Patent Office as the International Searching Authority for International Application No. PCT/EP2011/064286.

Written Opinion of the International Preliminary Examining Authority (PCT/IPEA/408) dated Jul. 3, 2013, by the European Patent Office as the International Preliminary Examining Authority for International Application No. PCT/EP2011/064286.

Notification of Transmittal of International Preliminary Report on Patentability (PCT/IPEA/416) and International Preliminary Report on Patentability (PCT/IPEA/409) dated Aug. 21, 2013, by the European Patent Office as the International Preliminary Examining Authority for International Application No. PCT/EP2011/064286.

Office Action (First Office Action) dated Mar. 24, 2015, by the State Intellectual Property Office of the People's Republic of China in corresponding Chinese Patent Application No. 201180074261.2 (8 pages).

English language translation of Office Action (Decision on Grant) dated Jun. 3, 2015, by the Russian Patent Office in corresponding Russian Patent Application No. 2014110397. (9 pages).

English language translation of Office Action dated Dec. 18, 2015, by the Chinese Patent Office in corresponding Chinese Patent Application No. 201180074261.2. (7 pages).

Communication pursuant to Article 94(3) EPC dated Sep. 21, 2018, by the European Patent Office in corresponding European Patent Application No. 11 764 116.7. (7 pages).

* cited by examiner

MEANS AND METHOD FOR DETECTING THE PRESENCE OF AT LEAST ONE OBJECT TO BE TIDIED IN A WASHROOM

CROSS REFERENCE TO RELATED APPLICATIONS

This application is a divisional application of U.S. patent application Ser. No. 14/238,409 filed on Feb. 11, 2014, which is a U.S. National Stage application of International Patent Application No. PCT/EP2011/064286 filed on Aug. 19, 2011, the entire contents of all of which are incorporated herein by reference.

FIELD OF THE PRESENT DISCLOSURE

The present disclosure is directed to providing means and method for detecting the presence of at least one object to be tidied in a washroom, such as at least one discarded paper towel, or other type of litter, on the floor of a washroom.

BACKGROUND TO THE PRESENT DISCLOSURE

WO2005/065509 discloses a system for controlling washroom dispensers. The system may include a first set of product dispensers in a first washroom and a second set of product dispensers in a second washroom that communicate respectively with first and second data communications units. The first and second data communications units in turn communicate with a central washroom monitoring station. The first set of product dispensers may be a first towel dispenser, a first tissue dispenser and a first soap dispenser, while the second set of product dispensers may be a second towel dispenser, a second tissue dispenser and a second soap dispenser. Each dispenser includes a dispenser sensor unit for detecting a product low condition. The dispenser sensor unit of the first set of product dispensers may communicate wirelessly with the first data communications unit and the dispenser sensor units of the second set of product dispensers may communicate wirelessly with the second data communications unit. The first and second data communications units communicate with the central washroom monitoring station to provide a product low warning message for any one of the dispensers so that a janitor or maintenance person can be dispatched to refill the product as necessary.

The communications between the dispenser and the data communications units and the washroom monitoring station can be wired or wireless. In some implementations, the data communications units can be left out and the dispensers can communicate directly with the washroom monitoring station. In one implementation, the maintenance personnel can inspect the dispensers by logging into an interface with the data communications units from the washroom monitoring station. This interface could be a website provided with data from the data communications units. The maintenance personnel could inspect such a website from an internet capable handheld device so that maintenance requirements can be inspected on site, but not necessarily in the particular washroom that has the dispenser in a low product condition. Alternatively, the washroom monitoring station can send an SMS or email to the relevant maintenance personnel of the low product condition and the location of the relevant dispenser.

Importantly, the maintenance personnel are informed of the requirement for product refills without having to physically inspect each dispenser in each washroom. The efficiency of use of the maintenance personnel can thus be improved.

WO 2005/065509 also discloses (reference is made to FIG. 34) a camera 1132 positioned for viewing the floor of a washroom. The camera is capable of viewing water 1134 from a water spillage on the floor or debris 1136 such as used paper towels thrown on the floor. In one implementation, a user monitors the washroom floor captured by the camera at a washroom monitoring station. That is, the video from the camera is transferred to the washroom monitoring station for viewing by maintenance personnel. Another proposal is for the camera or the washroom monitoring station to automatically alert on the presence of water or debris. WO 2005/065509 does not describe any way of implementing such automatic debris detection.

The camera based system of WO 2005/065509 for detecting the presence of debris suffers from at least two drawbacks. Disposing a camera in a washroom, even at floor level, may not be tolerable at some sites or for some clients for privacy reasons. Further, automatic detection of debris in the washroom from the video captured by the camera is non-trivial to implement in a working system.

SUMMARY

The present disclosure is aimed at providing a means and method for detecting the presence of an object to be cleaned.

In one aspect of the present disclosure, there is provided a system for determining the presence of at least one object to be tidied in a washroom, comprising: a beam supply unit for supplying a beam to a surface of a washroom at a first location; a reflected beam detection unit to receive the beam reflected from the surface of the washroom or to receive the beam reflected from at least one object in the path of the beam to the surface; and
a controller configured to determine from feedback from the beam detection unit the presence of the object based on a comparison of the feedback from the beam detection unit and a detection result when the beam reflects from the surface at the first location and to consequently issue an object to be-tidied output signal indicating that an object to be tidied is present.

The apparatus of the disclosure provides a concrete and reliable algorithm for automated detection of an object to be tidied in a washroom by emission and reflection of a beam of energy and comparison of the reflected beam with an expected detection result if the beam had of reflected from the usual washroom surface. If the detection result is as expected, e.g. indicative of a full travel path to the surface for the beam, then the algorithm can determine that there is no object to be tidied along the path of the beam. If the travel path of the beam is reduced as compared to the travel path to the washroom surface, then an indication is given of an object being in the way. The resulting output signal can be sent to maintenance personnel in some way so that someone can be sent to the washroom to tidy away the object. The object may, for example, be a paper towel that needs to be placed in a litter bin to preserve a clean appearance to the washroom. Automatic detection of litter to be tidied away allows a washroom to be kept tidy, and thus appearing hygienic to a guest of the washroom, in a way that utilises maintenance resources efficiently. It is a general goal of hygiene services providers for washrooms to be kept hygienic and for the washroom to reflect this hygienic state in its appearance. The system of the present invention aids in meeting this goal.

The present disclosure is also directed to a method of detecting the presence of an object to be tidied in a washroom, the method comprising:
directing a beam to a washroom surface at a first location;
detecting a reflection of the beam;
determining whether the beam has travelled a reduced travel path and has reflected from an object to be tidied in the travel path of the beam to the surface at the first location based on a comparison of the detection result of the reflected beam with an expected detection result if the beam had travelled to the surface of the washroom at the first location.

The beam may be a beam of wave-like energy such as electromagnetic radiation or sound. More particularly, the wave-like energy may be non-discernable for a human guest of the washroom such as non-visible light or ultrasound. The electromagnetic radiation may be laser, infrared or radar or any other type of visible or non-visible electromagnetic radiation. It is preferably laser.

The beam supply unit and beam detection unit may be separate units in that drive signals from the former are independent of sense signals of the latter. They may, however, be integrated so that the emission component is also used for detection. For example, in the case of ultrasound beams, an ultrasonic transceiver can be used, which uses the same ultrasonic element (i.e. a piezoelectric element) for emission and detection of ultrasound.

The surface at the first location may be a surface of a wall or other structural component of the washroom. It is generally a permanent surface of the washroom as compared to a transient presence such as litter that will be tidied away or a part of a guest of the washroom.

Preferably, the controller is configured to determine distance data on the travel path of the beam from the detection result of the reflected beam and to determine the presence of the object to be tidied on the basis of the determined distance data as compared to predetermined distance data on the travel path to the surface of the washroom at the first location. Thus, if the predetermined distance to the surface of the washroom is y and the controller determines that the beam reflected at a distance x from the beam emitter and if $(y-x)>0$, then the beam has reflected before expected, thereby indicating the presence of an object to be tidied in the washroom between the beam emitter and the surface at the first location. If, however, the comparison indicates that the distance travelled by the beam is as expected then a determination may be issued that no objects to be tidied have been found.

In method terms, the method comprises determining distance data on the travel path of the beam from the detection of the reflected beam and comparing the distance data to predetermined distance data on the travel path of the beam to the surface of the washroom at the first location to determine if a reduced travel path has been traversed by the beam as a result of the beam reflecting off of an object to be tidied as compared to if the beam follows the full path to the surface of the washroom at the first location, to thereby determine the presence of the object.

The apparatus of the present disclosure may thus utilise known distance measuring technology that uses a beam to determine a distance to a reflection surface. The controller may be configured to compare the distance so determined to a predetermined distance to the surface of the washroom at the first location and if the determined distance is shorter, then an indication of an object to be tidied being present is provided. Otherwise, an indication of a clean room at that location can be issued. A simple (as it uses known technology), yet effective solution for determining when a tidying operation for a washroom needs to be performed is thus arrived at, in a way that does not offend against a washroom guest's sense of privacy.

The distance measurement may be done with a laser distance measurement device utilising a triangulation, time of flight, phase shift or other known method. Alternatively, the distance measurement may be done with an ultrasonic distance measurement device utilising a time of flight method. Such distance measurement devices are in the public domain and can be purchased from a myriad of suppliers. The present invention thus makes use of existing technology in order to meet the above presented objects of the invention.

Preferably, the controller is configured to perform a calibration process to obtain data on a detection result to be expected when the beam reflects off of the surface of the washroom at the first location. The controller is configured to store the detection result in a memory. The controller is configured to access the predetermined data for comparing to the current reflected beam detection result in determining whether the beam has reflected from an object to be tidied in the path of the beam to the washroom surface at the first location.

In method terms, the method may comprise a calibration step of determining a detection result obtained by reflecting the beam off of the first surface of the washroom at the first location and storing the detection result as predetermined data and comparing the reflected beam detection result to the predetermined data in determining whether the beam has reflected instead from an object to be tidied in the way of the beam on its path to the surface of the washroom at the first location.

Preferably, the apparatus comprises a calibration option that a user interfaces with (e.g. a user pressable calibration button) to get the apparatus to perform a calibration scan when the washroom is tidy to gather predetermined data for when the beam reflects off of the surface at the first location for use as reference data in the comparison. In method terms, the method comprises the user interfacing with the calibration option to instigate the calibration step.

Preferably, the beam supply unit is configured to direct the beam along the floor of a washroom so as to be able to interact (i.e. by way of reflection from it) with an object to be tidied on the floor. Alternatively, however, the beam supply and detection units may be arranged to detect the presence of an object to be tidied located on any surface of a washroom, such as on a counter top (e.g. between where sinks are installed in the counter top). Preferably, the beam supply unit is configured to direct the beam to a surface extending normally from the floor of the washroom, such as washroom walls.

In method terms, the method comprises directing the beam along (i.e. parallel to) the floor of the washroom to the surface of the washroom at the first location in order to reflect off of an object to be tidied (e.g. a used paper towel discarded onto the floor) that is in the way of the beam and that is on the floor. The beam is preferably directed at a surface of the washroom extending normally from the floor, which provides the surface of the washroom at the first location.

Preferably, the beam supply unit is configured to direct a plurality of beams at at least one surface of the washroom at a plurality of different locations, respectively. Further, the control unit is configured to compare a reflected beam detection result for the plurality of beams to a predetermined detection result for the beams when they travelled fully to the intended reflection surface of the washroom at the respective locations. The control unit is configured to make a determination as to the presence of at least one object to be tidied based on the comparison.

In this way, the determination can be made that at least one object to be tided is present in the event that the reflected beam detection result differs from the predetermined detection result.

In method terms, the method comprises directing a plurality of beams at at least one surface of the washroom at a plurality of different locations, respectively and comparing a reflected beam detection result to a predetermined detection result for when the beam reflects off of the surface of the washroom at the plurality of locations and making the determination as to the presence of at least one object to be tidied based on the comparison. In this way, if the reflected beam detection result reveals a reduced travel path for the beams as compared to the full travel path to the at least one surface at the plurality of locations, then an indication is provided that at least one object to be tidied is present in the washroom.

The use of a plurality of beams aimed at a plurality of locations distributed around the room enables the object detection means and method to cover as much of the room as desired in a relatively simple system to install. The beam supply unit is able to scan the room at locations distributed throughout the area of desired coverage to determine whether at least one object to be tidied is present in that area.

The beam supply unit could be configured to sequentially direct the beams to the plurality of locations or the beams could go out simultaneously. In the sequential case, a turning unit could be utilised to turn at least part of the beam supply unit so as to aim the beam at the next location. In the simultaneous case, a prism could be utilised to split a source beam into a plurality of beams directed to a respective one of the plurality of locations.

The comparison could be done on a location by location basis (that is, for each beam, a reflected beam detection result for a given location could be compared with a corresponding predetermined detection result for that location) or the comparison could be done en masse. So, in the latter alternative, the controller is configured to take the reflected beam detection results for each of the plurality of locations as a group to form a reflected beam detection fingerprint. The controller could then be configured to compare the reflected beam detection fingerprint to a predetermined fingerprint including grouped detection results for when the beam reflected off of the at least one surface at the plurality of locations. The fingerprints could be in the form of distance versus location data for each location, accumulated distance data summing the distance traversed for each location, etc.

As explained above, preferably, the beam supply unit is arranged so that the beams travel along the washroom floor to the plurality of locations and are reflected back to travel also along the washroom floor. A corresponding method step may be provided.

In a preferred embodiment of the apparatus or the method, the locations are sufficiently distributed about the washroom that a plurality of adjacent objects to be tidied (e.g. used paper towels) could be detected.

Preferably, the beam supply unit is configured to distribute beams for determining the presence of an object to be tidied relative to a source of the beams throughout an arc angle of at least 60°, 70°, 80°, etc. in 10° increments up to at least 180°, perhaps even up to 360°. That is, an arc angle could be defined between the opposing beams at the most extreme ends of the full scan coverage of the beam supply apparatus, with the source taken as a centre point of the arc. The beams may be distributed throughout the arc by a maximum separation of 20°, 19°, 18°, 17°, etc in decrements of 1° to a maximum separation of 1°. These separations are to be selected in view of balancing the requirement to have high resolution scans for determining the presence of small items to be tidied with other factors such as power consumption for the extra beams and the added processing complexity for each extra beam. Preferably, the beams are distributed evenly throughout the scan area of the apparatus.

Preferably, the controller is configured to determine the presence of an object to be tidied in a way that includes at least one processing step to distinguish more transient things in the way of the beam such as a guest of the washroom. Thus, the controller could be configured to require a minimum number of iterations (greater than 1) of a comparison step in a row that reveals the presence of an object in the way of the at least one beam on its way to the at least one surface at the first location or at the plurality of locations before an output signal is issued indicating the presence of an object to be tidied. In this way, an object to be tidied that will be on the floor for each of the iterations is distinguished from a guest being in the washroom for just one or a few iterations. A corresponding method feature may be provided.

Put another way, the controller is configured to require a positive determination on the presence of at least one object to be tidied for at least two successive scans of the beam in the washroom before an output signal is issued indicating the presence of an object to be tidied in the washroom. In the context of the present application, a scan should be understood as being a full cycle of beam emission, reflection and detection at the location (in the case of the first location being the only location) or each location (in the case of there being a plurality of locations). Once the scanner begins a new cycle of beam emission, reflection and detection at the or each location, then a new scan is taking place.

A scan of the beam supply unit can be defined in which a respective beam is directed at each of the locations just once and a reflection result is taken for each of those locations. A determination can be considered to be made for each scan of the beam supply unit on the presence of an object to be tidied. In one embodiment of the invention, a positive determination on the presence of an object to be tidied (based on the comparison) must be made for a given number (greater than 1) of successive sweeps for an output signal to be issued that an object to be tidied is present in the washroom. A corresponding method feature may be provided.

The controller may be configured to require a positive determination to be made on the presence of an object on the basis of a beam aimed at the same location in two successive scans before an output signal is issued indicating the presence of an object to be tidied. This requires the object not to have moved with respect to the scanning beam over two scans, thereby providing further assurance that the object is an inanimate one to be tidied away.

The number of iterations required could be 2 or greater, 3 or greater, 4 or greater, etc. in increments of 1 up to 12 or greater. The selection of the number of iterations depends to some extent on the expected amount of time a guest would usually be in a washroom (e.g. 5 minutes to 30 minutes) and the sweep rate of the beam supply unit (e.g. 1 sweep per minute for an expected guest time of 5 minutes would mean at least 6 iterations of comparison before an output signal is issued indicating the presence of an object). The sweep rate will be selected with a view to balancing providing a system that is better able to determine when an object is to be tidied as compared to infrequent inspections by a maintenance person with other factors such as power consumption.

In a preferred embodiment, the controller is, in addition to or as an alternative to, requiring a minimum number of positive comparison iterations, configured to determine the presence of an object to be tidied in a way that includes at least one processing step requiring a certain minimum coverage of the product in the scanned area of the washroom for an output signal indicating a tidying operation is required in the washroom. In this way, the output signal does not issue if just one small object to be tidied is present. Instead, the coverage by the at least one object must be such that it is worth the time for the maintenance personal to go to the washroom since a significant amount of tidying is required. The minimum amount of coverage required will be set based on balancing the desire to keep the washroom looking in a clean state for as much of the time as possible and the somewhat contrasting requirement for efficiently using maintenance resources. A corresponding method feature may be provided.

In a preferred embodiment, the controller is configured to require a plurality of reflected beams in a given sweep of washroom to reveal reflection off of at least one object to be tidied rather than the respective location of the at least one surface of the washroom for the output signal to be issued indicating that the washroom requires tidying. A corresponding method feature may be provided. In this way, there must be enough waste to be cleared for a plurality of differently directed beams to hit an item to be tidied on its way to the at least one surface. This processing step thus ensures a certain minimum waste spread before the indication of cleaning required is outputted.

In a preferred embodiment, the apparatus comprises a signal sending unit that is able to, preferably wirelessly, communicate with a user interface device, wherein the controller is configured to control the signal sending unit to send the output signal indicating that the room requires tidying to the user interface device. The user interface device may be a central washroom monitoring station for receiving corresponding signals from a plurality of such apparatus in different washrooms, a handheld device of a maintenance person or an intermediate washroom unit for receiving the sent signal and passing it on to a handheld device or a central washroom monitoring station, preferably wirelessly. In the case of sending the signal to a handheld communication device of a maintenance person, this is required to be done wirelessly, whether it be from the signal sending unit or the intermediate washroom unit. The intermediate washroom unit preferably is configured to receive output signals from a plurality of washroom devices such as a soap dispenser, a paper towel dispenser, etc., preferably wirelessly.

In method terms, a signal is preferably sent to a user interface device to communicate to a user that a tidying operation is required in the washroom, when said output signal indicates the presence of at least one object to be tidied. Preferably, the method comprises a user responding to the signal and a maintenance person consequently going to the washroom to tidy the at least one object.

In a preferred embodiment, there is provided a litter bin having the apparatus described previously mounted to it or part of it. Preferably, the bin comprises a litter receiving mouth at a top end and the apparatus is provided at a bottom end. The inventors have realised that often bins are mounted close to (e.g. marginally raised from) or on the floor and also that it is around a bin that objects to be tidied are most likely to be located in a washroom. Accordingly, providing the detection apparatus of the present invention in association with a bin allows objects to be tidied to be readily detected, particularly when located at the bottom of the bin since floor scans can then be performed.

In an aspect of the invention, there is provided a waste bin comprising:

a beam supply unit for supplying a beam to a surface of a washroom at a first location;

a reflected beam detection unit to receive the beam reflected from the surface of the washroom or to receive the beam reflected from at least one object in the path of the beam to the surface; and wherein the beam supply unit and the reflected beam detection unit are arranged at a bottom end of the waste bin and the beam supply unit is arranged to send the beam along the floor of the washroom to detect the presence of an object to be tidied.

Thus, the present disclosure contemplates a waste bin that is able to detect the presence of objects to be tidied in its vicinity by using energy beams. The processor described above for performing a comparison with predetermined data is not necessarily a part of this bin. However, other structural components concerning the directing, supplying and detecting of the beams may be. The processing may be carried out by a processor external of the bin to which a transmission unit communicates data from the beam supply unit and the reflected beam detection unit. The turning unit described above may be part of the bin. Further, the beam supply unit is preferably configured to distribute beams about the washroom to a multitude of locations to be able to detect the presence of an object to be tidied (or to confirm a clean room).

The bin can be described as comprising a waste receptacle, an opening through which waste is entered into the waste receptacle. The opening may be at the top of the bin. The bin may be openable (e.g. by removing a lid portion or by hingedly opening a door) so as to insert a liner to the waste receptacle and/or to remove a full liner from the waste receptacle.

Preferably, the present disclosure is directed to a washroom system arranged with an apparatus as described above. Preferably, the washroom system comprises a washroom having the apparatus located therein. Preferably, the washroom comprises a washroom floor and the apparatus is arranged for determining the presence of at least one object to be tidied located on the washroom floor. Preferably, the washroom system comprises an intermediate washroom unit, a handheld communication device, and/or a washroom monitoring station as described above. Preferably, the washroom system comprises a dispenser as described above.

More especially, the washroom system comprises at least one of a soap dispenser, a paper towel dispenser, a hand towel dispenser, particularly paper hand towels, and a toilet paper dispenser. The paper hand towel dispenser or the toilet paper dispenser may hold the paper in stack or roll form. A stack of paper may be folded or interfolded sheets. The roll of paper may include lines of weakness for ease of separating adjacent sheet products. Any combination of these dispensers may be provided. A (each) dispenser may include a product level sensor. A (each) dispenser may communicate with an intermediate washroom unit, particularly concerning a level of product in the dispenser. The object detection apparatus may also communicate with the washroom unit, which ultimately will communicate with a maintenance attendant interface. Such a system will allow a maintenance attendant to remotely monitor how much product is remaining in the dispensers as well as whether the washroom is tidy, perhaps among other aspects of the washroom system to monitored.

DETAILED DESCRIPTION OF PREFERRED EMBODIMENTS OF THE INVENTION

The present disclosure is concerned with detecting the presence of waste, such as discarded paper towels, in a public washroom, particularly on the floor of a washroom. If this can be detected in an automated and reliable way, then efficiency of use of maintenance personnel can be increased since it can be known when a maintenance call is made that tidying is definitely required.

To fulfil the above objective, there is proposed a beam emission and reflection device that scans the washroom, particularly the floor, and detects a reflection of the beam. A controller can determine from the detected reflected beam as compared to predetermined data on when the beam travels to one or more fixed surfaces of the washroom whether the beam has traversed a reduced path as compared to that expected. If so, then an indication is given that a reflection from a waste object in the way of the beam has occurred. If not, a positive confirmation can be issued that an object was not detected in the way of the beam, thereby indicating a clean washroom. The controller also includes processing capability to ensure that the waste object is not transitory such as in the case of a guest of the washroom. The processing steps may thus include a requirement for the waste object to be detected without interruption for a predetermined amount of time differentiating reflection from a part of a guest of the washroom and reflection from waste on the basis of an expected maximum amount of time that a guest will generally be in the washroom.

Scanning the room may be carried out by sending out beams along different paths distributed throughout an area of interest of the washroom. The apparatus may have a mechanism for associating the reflection data with the beam position so that any determination of an object in the way of the beam can be beam location specific. Location specific data is useful in being able to carry out the above described processing for determining whether the object is transitory because a waste object will not move location but a guest would after some time.

The controller may also require a certain amount of spread of waste through a washroom scan before maintenance is alerted. Thus, there may be a certain minimum plural number of beams that indicate the presence of a waste object, so that maintenance is only alerted once there is an unacceptably high degree of waste in the room.

The controller is configured to output an alert once at least one of the criteria identified above have been met indicating that a maintenance operation is required. The output alert may go straight to a user interface unit, such as a central washroom monitoring computer or a handheld mobile communications device held by a maintenance person, or it may reach the user interface unit via an intermediate station for collecting outputs from a plurality of washroom devices, such as a plurality of waste detection devices, or a waste detection device and at least one washroom dispenser. The washroom dispenser may be a paper towel dispenser, a soap dispenser, a toilet paper dispenser, etc. The dispenser may include a product level sensor and a transmission unit for communicating product level information with the intermediate station. The intermediate station is thus provided to product level information and washroom cleanliness information to provide a powerful maintenance tool.

Figure 1:
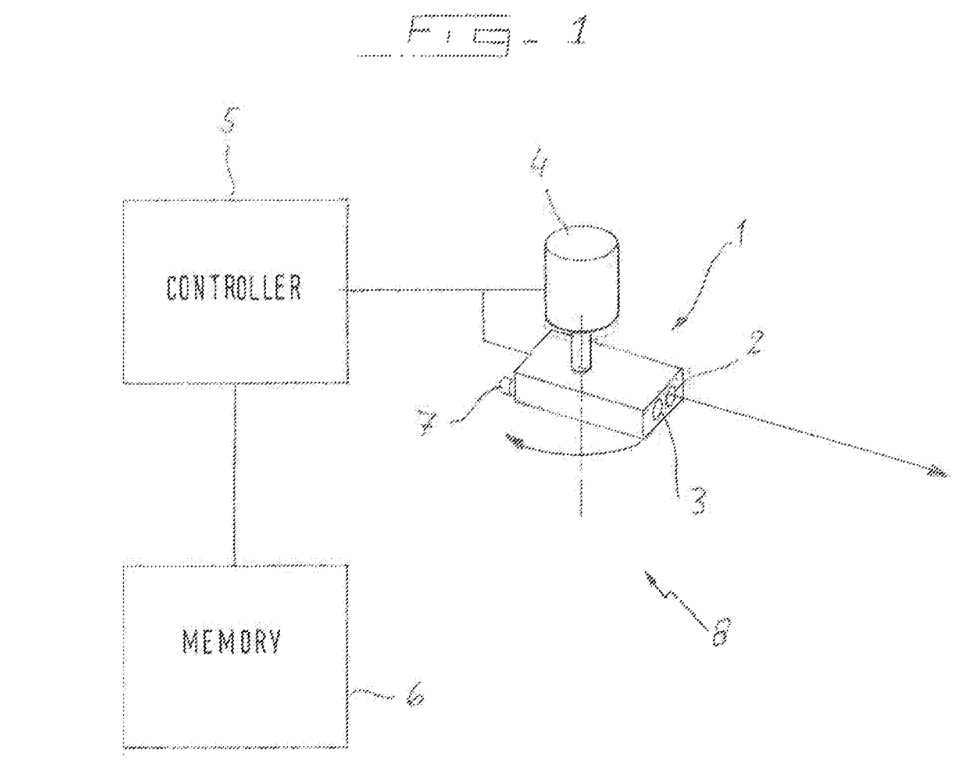
FIG. 1 shows a laser emission and detection device for use in one embodiment of the present invention that is operable to emit laser beams and detect the return signal. The device is associated with a turning motor so that the laser beam can be emitted in different directions and corresponding detections can be made for the reflected last beam from each of those directions.

Referring now to the figures, there is shown in FIG. 1 a conceptual illustration of one possible implementation of an apparatus 8 for detecting the presence of waste material to be tidied that comprises a beam emission and detection unit 1. The unit 1 comprises a beam emission unit 2 configured to emit a beam of waveform energy, preferably as a laser, along a washroom to usually meet a permanent surface of the room and reflect back from that surface. The unit 1 also comprises a beam reflection detection unit 3 that receives and detects the reflected beam.

A turning unit 4 is provided in the preferred form of a motor, particularly a stepper motor. The turning unit 4 rotates the beam emission and detection unit into respective positions so that beams can be emitted and reflection detection made at each discrete location.

A controller 5 is also shown conceptually in FIG. 1 in operative communication with the beam emission and detection unit 1 and with the turning unit 4. The controller is able to receive reflection data on the reflected beam from the beam emission and detection unit 1 indicative of path length traversed by the beam. The beam emission and detection unit 1 is able to determine the path length from the reflected beam based on known range finding technology. Such range finding devices are readily available on the market and can accurately determine the path length to a reflection surface based on time of flight, interferometer, phase shift or other known distance measuring algorithms.

The controller 5 is also in communication with the turning unit 4 so as to receive location data from the turning unit 4. This can be performed by way of an encoder wheel associated with the turning unit 4 or by counting motor steps. The invention also encompasses a waste bin having the apparatus 1 mounted to a bottom of it, which may or may not include the controller 5 and memory 6, as described further below.

In use, the beam emission and detection unit 1 is rotated to a number of discrete locations by the turning unit 4 at which a beam is emitted from the emission unit 2 and a reflection of the beam is detected by the reflection detection unit 3. The beam emission and detection unit 1 is able to calculate data indicative of the length of the path traversed by the beam to the reflection surface from a signal provided by the reflection detection unit 3 on the reflected beam. This length data is communicated to the controller 5. Similarly, location data is transmitted to the controller 5 from the turning unit 4.

An example set of data assuming that the turning unit 5 moves to five discrete locations (more than five locations could be used) in one scan of the washroom and data is collected from a reflected beam at each location could be as follows.

| Location | Distance to reflection surface (arbitrary units) |
|---|---|
| 1 | 20 |
| 2 | 10 |
| 3 | 20 |
| 4 | 10 |
| 5 | 20 |

The controller 5 also has access to a memory 6 in which is stored predetermined data on the distances that the beams will travel for each location to a permanent surface of the washroom, in the absence of waste material in the way of the beam. Exemplary such predetermined data can be as shown in the table below. Note, since the distance data in the below table is the same at each location, the reflection surface of the washroom defines a circular plane having a circle centre at the beam emission and detection unit 1.

| Location | Distance to reflection surface (arbitrary units) |
|---|---|
| 1 | 20 |
| 2 | 20 |
| 3 | 20 |
| 4 | 20 |
| 5 | 20 |

The controller 5 is configured to do a data comparison between the data from the beam scan of the washroom and the predetermined data. This comparison can be done as the measurement data for each location is received at the controller, or the comparison can be done on the basis of a set of measurement data, such as for a full scan. The comparison reveals if there is a difference between the distance to the permanent reflection surface of the washroom and a location at which reflection actually took place, e.g. from a discarded paper towel in the way of the beam. The distance difference must be sufficient to be actually indicative of a different than expected reflection surface. That is, the beam emission and reflection detection unit 1 will be accurate only within a certain distance range (e.g. +/−2 mm over a distance of 2 m). The determined distance difference must fall outside of this range for a positive determination to be made that an object is in the way of the beam. In the above example, the measurement data differs from the predetermined data at locations 2 and 4, thereby indicating that a waste object is present in these two locations.

It could be that any difference between the predetermined data resulted from reflection from a part of a guest of the washroom. In order to avoid false waste detections, the controller 5 may be configured to require the measurement data indicating an object in the way for a particular location to be repeated for a predetermined amount of time or a predetermined number of scans of the washroom. Thus, taking as the assumption that a user is usually present in the washroom for a maximum amount of time of x minutes (e.g. 5 minutes), then the scans must reveal the presence of the object at the respective locations for an uninterrupted amount of time of x minutes (or the equivalent time in number of scans of the washroom). Thus, in the above example, the comparison is required to reveal an object in the way at locations 2 and 4 for each scan for 5 minutes. The time requirement may not necessarily be location specific.

If the above described predetermined time requirement is met according to the controller 5, then an output signal is output to indicate that there is waste present in the washroom that needs to be cleared. The controller 5 may issue the output signal wirelessly or wired so as to alert a maintenance person that the washroom has been automatically found to need tidying.

The controller 5 may further impose a requirement for there to be a sufficient spread of waste objects to be cleared before the output signal is issued. That is, it is necessary for a determination to be made on the presence of a waste object to be cleared at more than one location (or more than two, etc.) in the scan before the output signal is issued by the controller 5. In the above example case, assuming the reflection distance of 10 is determined for locations 2 and 4 for the predetermined amount of time x, then a determination is made that an object is there to be cleared. Further, since there is more than one location at which an object to be cleared has been determined by the controller 5, then the output signal can be issued to alert a maintenance person to the problem.

The predetermined data can be loaded into the memory 6 by an installer of the unit 1 or a maintenance person operating a calibration input 7, e.g. a button. The calibration button 7 is operable to cause a calibration scan of the washroom to gather reference data for the distances of reflection surfaces at each of the locations in the washroom. The calibration operation may involve multiple scans of the washroom and taking an average of the distances at each of the locations. The calibration button 7 should only be operated when the room is clean and the beams are able to reflect from permanent surfaces of the washroom without interference from objects to be tidied. It may be that an operative will perform a calibration scan by pressing the button 7 any time that a layout change has taken place in the washroom. The controller 5 is configured to receive the data from the calibration scan for each of the locations and store the reference data in the memory as the predetermined data.

The apparatus 8 can also be configured for energy efficiency. This is generally a desirable goal, but is particularly important if the apparatus 8 or at least the turning unit 4 and beam emission and detection unit 1 are battery powered. To save on power, the apparatus 8 may be set up so as to only perform a scan relatively seldom in a power save mode, but is also configurable into a detection mode in which more frequent scans of the washroom are performed. The power save mode can be the default operation and the controller 5 can be configured to activate the detection mode when the reflection data indicates that an object to be tidied is present. The detection mode is frequent enough so that the transience tests described above can be performed by the controller 5. That is, the frequency of the scans under the detection mode is greater than the predetermined time required for an object to be present for it to be deemed an object to be tidied rather than a transient object. More specifically, there must be more than one scan every x minutes in the detection mode, where x is defined above. In the power save mode, the number of scans must still be sufficient that the washroom is not able to get into an unacceptably untidy state in that time. Thus, in the power save mode, there may be 1 to 10 scans per hour, while there may be 1 to 20 scans every 5 minutes in the detection mode. The power save mode may do scans 2 to 20 times less frequently than the detection mode.

To summarise the use of the apparatus 8 of FIG. 1, a washroom attendant would press the calibration button 7 when the washroom is empty to begin a calibration scan. A calibration scan will begin after a predetermined amount of time (such as 20 seconds) in order to give the maintenance attendant enough time to leave the washroom or at least leave the scanning path of the apparatus 8, so that the scan is done when the washroom is empty. Further, the attendant will, of course, be required to first clean the washroom of any objects that are not permanent fixtures of the washroom, such as waste paper on the floor, to ensure that a proper calibration scan is performed. The beam emission and detection unit 1 is thus turned by the turning unit 4 through a multitude of angles so that a distance measurement is performed based on a distance determination made by the controller 5 as a result of the distance traversed by the beam emitted and the reflected beam detected. The turning unit 4 may move the beam emission and detection unit so that a distance measurement is taken at angles of at least every ten degrees (for example) and the beam emission and detection unit may be rotated through an angle of around 90° if the apparatus 1 is placed in a corner of the washroom, around 180° if the apparatus 1 is positioned along a wall of the washroom, or around 360° if the apparatus is positioned in a centre of the washroom relative to the walls of the washroom. The calibration button 7 may allow the maintenance attendant to set the extreme ends of the scan so that only the area of interest is covered.

The measurements taken at each location are stored in the memory 6 as calibration data. The controller 5 will subsequently control the beam emission and detection unit 1 so as to periodically scan the room to obtain current data. The controller 5 compares the data to the calibration data stored in the memory 6 in order to determine whether an object to be tidied is present. If it is determined that the washroom remains clean, then the controller 5 may issue an output signal which may be transmitted to a maintenance attendant as described below confirming that the washroom is in a cleaned condition. If the comparison determines a difference in the current data as compared to the calibration data, then the controller 5 may be configured to issue an output signal indicating the presence of at least one object during that scan, which may be sent to a maintenance attendant.

Preferably, however, the controller 5 requires a plurality of scans to indicate the presence of an object to be tidied before such an output signal is issued so that a distinction can be made between a transient object and an actual piece of waste that is to be cleaned form the floor of the washroom. For example, the algorithm may require a mismatch between the calibration data and the data received for a particular scan in the room to differ for at least 2, 3, 4, 5, 6, 7, 8, 9 or 10 scans of the washroom before a determination is made that the cause of the comparison difference is the presence of at least one object to be tidied. If the calibration data taken and the data taken during detection scanning differentiates the distance data at each location, then it is also possible to require not only that the comparison reveals a difference for a number of scans but that the comparison reveals a difference from the calibration data for at least two scans and the difference has to be at the same location(s) for the successive scans. This two layer method provides yet further confirmation that the object is a stationary and inanimate one, rather than a transient one, such as a part of a guest in the washroom.

Figure 2:
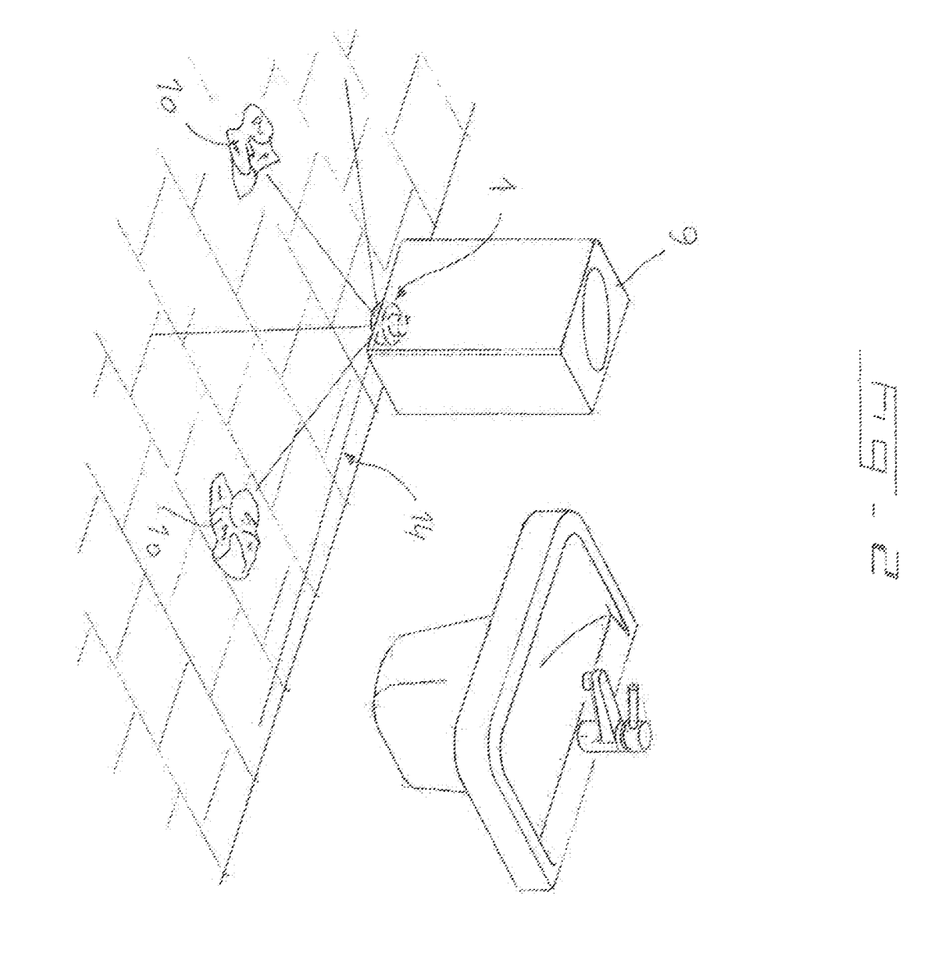
FIG. 2 shows a first washroom having a washroom waste disposal container with a laser emission and detection device, preferably according to that shown in FIG. 1, mounted on a bottom of it. The device is arranged so as to scan the floor with laser beams and detect the reflections so as to be able to determine the presence of at least one object to be tidied, such as a discarded paper towel.

FIG. 2 shows a washroom having a beam emission and detection unit 1 as described above provided in the washroom. The beam emission and detection unit 1 will be in communication with a controller 5 as shown conceptually in FIG. 1. The beam emission and detection unit 1 is arranged so as to direct the beams 14 along the floor of the washroom so as to reflect off of any objects on the floor that are about the height of a discarded paper towel, e.g. a balled paper towel or crumpled but substantially flat paper towel, or lower. For example, the beams 14 may be passed along the floor of a washroom at a height of 5 cm or less.

In one implementation, the washroom system of FIG. 2 is set up so that the controller 5 communicates directly with a handheld device of a maintenance person or a control washroom monitoring station as an output alert signal indicating that the washroom has been found by the controller to require tidying. The controller 5 may also issue an output signal confirming that the washroom is deemed not to require cleaning at present based on the above described processes for determining the presence of at least one object returning a negative result. The communication may be by way of a mobile network or a local wireless network.

As can be seen in FIG. 2, the emission and detection unit 1 is mounted to an underside of a bin 9 and the bin 9 is just elevated from the washroom floor.

The controller 5 is, in this embodiment, located with the beam emission and detection unit 1 on the bin 9. Means for issuing an output alert signal for alerting of the need for maintenance is also co-located with the controller 5 and the unit 1. In this embodiment, these components can be integrated into a singly mountable package for mounting to the bin 9 as one piece.

Figure 3:
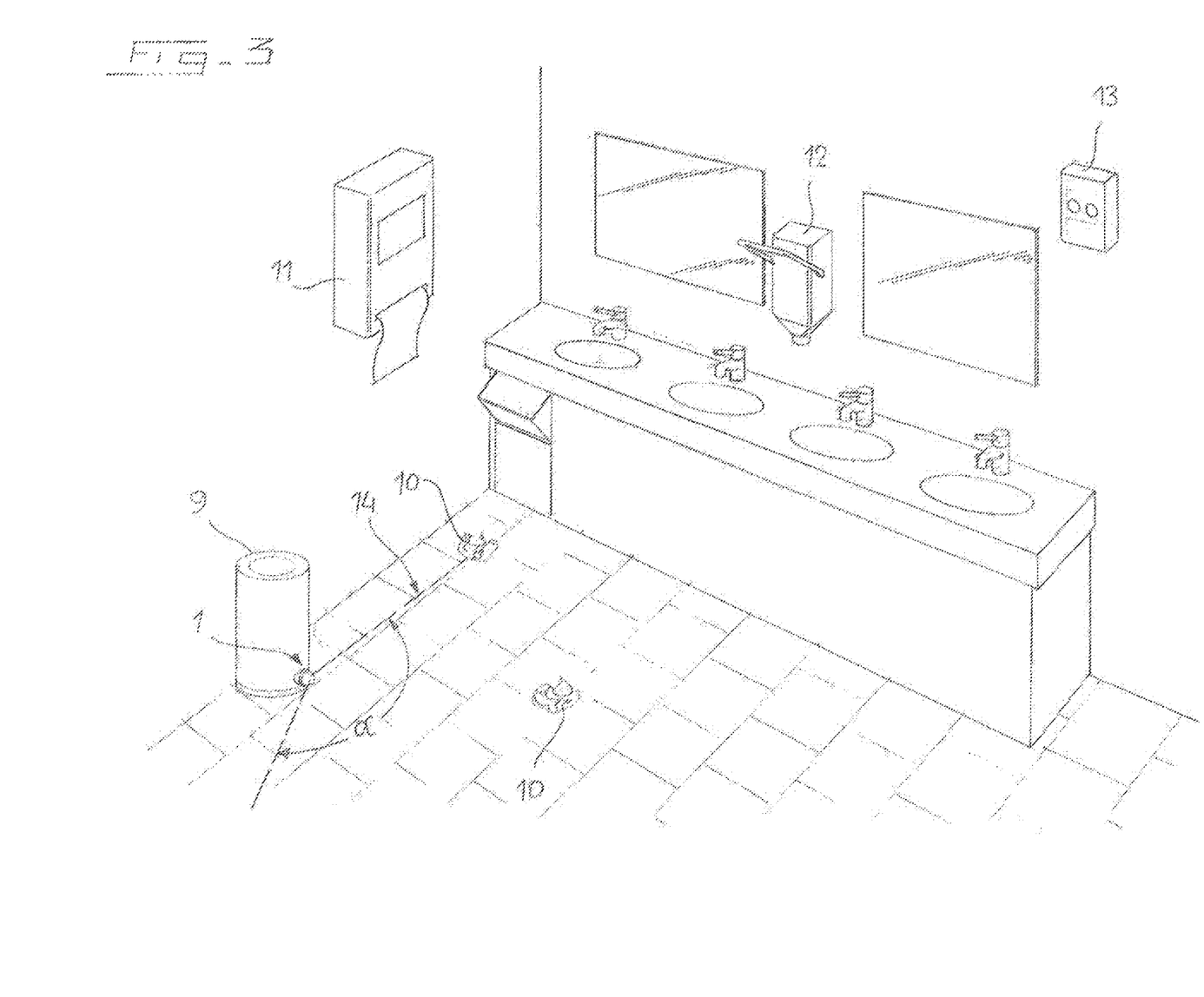
FIG. 3 shows a second washroom having a different type of washroom waste disposal container having a beam based, preferably laser, waste detection device, and also having a soap dispenser and a paper towel dispenser. There is further provided in the second washroom a washroom communications unit for receiving signals from at least one dispenser and the laser waste detection means and for communicating with a maintenance user interface to indicate when a maintenance operation is required.

FIG. 3 shows another washroom system design. In this design, the beam emission and detection unit 1 is again mounted to a bin 9 and arranged to fire beams 14 along the floor of the room to detect the presence of objects 10 to be tidied on the floor. The washroom system further comprises a paper towel or tissue dispenser 9, a soap dispenser 12 and a communications unit 13. Like with the washroom system of FIG. 2, the unit 1 operates as described above with respect to FIG. 1 in the washroom system of FIG. 3.

The system of FIG. 3 differs in one respect to the washroom system of FIG. 2 because the bin 9 is not wall mounted in a condition elevated from the washroom floor and is instead placed on the washroom floor so as to stand on a base. The unit 1 is mounted in the base and is directed out of a sidewall of the bin 9 so as to aim beams along the washroom floor.

The system of FIG. 3 differs in another respect by the controller 5, which is in communication with the unit 1, being configured to issue the output alert to the communications unit 13. The communications unit 13 also receives output information from the paper towel dispenser 11 and the soap dispenser 12. Such output information can include dispenser low alerts, e.g. soap or paper towels are low and will shortly need refilling in the respective soap dispenser 12 and paper towel dispenser 11. Thus, the soap dispenser 12 and/or the paper towel dispenser 11 may include a product level sensor. The communications unit 13 is configured to report the alert information to a handheld device of a maintenance person or a central washroom monitoring station or some other user interface able to report the need for maintenance in the washroom to a user. The communications unit may communicate with the soap dispenser 12, the paper towel dispenser 11, the beam emission and detection apparatus 8 in a wired or wireless manner. The communications unit 13 may communicate with the user interface using a mobile network or a local wireless network.

The washroom system of FIG. 2 may be in a neighbouring washroom to that of FIG. 3. In this case, there is a first and a second waste detection apparatus 8 in respective washrooms. In one implementation, both of these apparatus may be in communication with the same communications unit 13 to report output alerts regarding a determination that a tidying operation in either one or both of the washrooms is required.

In the waste detection apparatus 8 described above with respect to FIGS. 1 to 3, the controller 5 is provided integrated with the laser beam emission and detection unit 1. An alternative implementation can be envisaged that would also be an embodiment of the claimed detection apparatus, whereby the controller 5 is dislocated from the unit 1. In such an embodiment, the laser beam emission and detection unit 1 could be provided with the capability to send the location and distance to reflection surface data wirelessly or by wired connection to the dislocated controller. The controller could thus be provided as a physical part of the communications device 13 of the system of FIG. 3 or it could be a programmed element of a washroom monitoring station or a maintenance person's handheld device. The programmed element could systematically receive the data and process it to determine whether an output alert signal is required on the basis of calculations determining whether waste material is present on the washroom floor.

In the detection apparatus 8 of FIG. 1, the turning unit is provided as a stepper motor 4 connected to the unit 1. A number of alternative ways of turning the emitted beams so that they are aimed at different locations can be envisaged. For example, a supporting turntable could be used to move the unit 1 to respective discrete locations. In another alternative, the beam source could remain stationary, while a scanning mirror is rotated in order to move the beams to respective locations.

In the preferred embodiment, the beam emitter and detection unit 1 uses laser beams to determine the distance to a reflection surface. Ultrasound range finders among other reflected beam based technologies are known in the art and could be used in alternative embodiments of the present invention.

Also, in the above, the beams are sent to respective locations by a turning unit 4. An alternative would be to use a prism for the function of emitting beams to a plurality of locations distributed throughout a washroom for performing a waste detection scan.

Means have been described above for avoiding determining waste being present falsely when the reflection actually occurs from a part of a guest of the washroom. Alternative or additional means could be provided. For example, a washroom system could be provided with an infrared sensor for determining when a guest leaves a washroom. The controller could be configured to only carry out waste detection scans of the washroom when a determination has been made that there are no guests in the washroom based on feedback from the movement sensor. Alternatively, the system could be linked to a light sensor or a light switch so that the room is only scanned when the lights are off, which would indicate that there is not a guest in the washroom. Alternatively, the scans for determining the presence of an object could be performed more frequently when the lights are off or the infrared sensor detects that the room is empty as compared to when it is determined that a guest is in the washroom. Instead of the infrared sensor or the light sensor or the light switch sensor, the trigger for performing scans of the washroom or more frequent scans of the washroom could be a door opening sensor. These features, allowing object scanning to be performed only when or more frequently when it is determined that the washroom is empty, provide power saving features for the apparatus.

Another possibility for implementing the above described power saving feature is that the room is scanned just once when it is determined that the washroom is empty of guests, since then it can be known that any reduced travel path traversed by the emitted beam is as a result of a reflection off of something inanimate that needs to be tidied away, whereas multiple scans are done when it is determined that a guest is in the washroom because these multiple scans are required in order to distinguish between a reduced travel path as a result of reflection from a guest and a reduced travel path as a result of reflection from an inanimate object that is to be tidied away.

In the embodiment described above with respect to FIG. 1, the algorithm requires a positive waste determination to be reached for a given location to occur for a predetermined amount of time before a maintenance alert output is issued. As well as being location specific (or as an alternative thereto), the algorithm could require the distance measurement for the beam to remain the same for the predetermined amount of time. This two dimensional aspect to the algorithm requires the reflection surface to have not moved in both the rotational direction of the beam as it moves from reflection location to reflection location and also to have remained stationary in the distance measuring direction for the beam at any location. Both of these requirements ensure that any incidents of false waste detection are minimised or eliminated.

In the algorithm given above with respect to FIG. 1, there is a requirement for a waste material determination to be made at a specific beam location for a predetermined amount of time. In an alternative configuration, the controller may be configured to determine the presence of waste material at any location from the reflection data from a scan of the washroom. Such an embodiment is not location specific and merely requires at least one occurrence of a reduced beam travel path than expected in the data for the full scan. The modified controller still requires a positive scan determination uninterruptedly in successive scans for the predetermined time before an output alert is issued but the locations of the positive determinations is not taken into account. This may increase the incidence of false positives but simplifies the detection apparatus since the controller does not have to receive location data in association with the distance measurements and the turning unit does not have to generate the location data.

In the algorithm described with respect to FIG. 1, the power saving mode is implemented by reducing the number of scans per unit time. Additionally or alternatively, the number of locations at which a distance measurement is taken per scan can be reduced, thereby reducing the power associated with generating the full set of beams, detecting results and processing the data. For example, one could take distance measurements at locations 1, 3 and 5 in a first full turn of the beam emission and diction unit and take distance measurements at locations 2, 4 and 6 in a second full turn of the beam emission and detection unit. Conceptually, this can still be considered as reducing the number of scans per unit time. In this example, the number of full data scans per unit time has been halved. It may be advantageous to implement the power save mode in this way since the frequency of the turning unit could be kept constant in both the detection mode and the power save mode, while the power requirements are reduced by reducing the frequency with which the beam emitter is operated.

An exemplary algorithm is given above describing how the controller 5 compares reflection data received with predetermined data stored in the memory 6. In the algorithm given above, the distance to a reflection surface at each location is compared on a location by location basis to the corresponding distance saved in the memory. If the travel path is reduced, then a determination is made that there is an object to be tidied at least at that location. In an alternative algorithm, the beam emission and detection unit 1 is rotated by the turning unit 4 to a multitude of different angular positions so as to direct the emitted beam at different locations along a floor of a washroom. At each of these locations, a distance measurement is made. The controller 5 sorts these distance measurements into distance bins, such as a bin for 0 to 0.5 m, a bin for 0.5 to 1 m, a bin for 1 to 1.5 m, etc. Thus, for a particular scan of the room, there is produced by the controller a sequence of distance bins having a certain number of measurements in them. For example, there may have been two measurements in the range of 0 to 0.5 m, five in the range of 0.5 to 1 m and three in the range of 1 to 1.5 m, etc.

This sequence of bins provides a finger print of the room that can be compared to a corresponding finger print stored in the memory that has been produced by a calibration scan. When there is a mismatch between the bins produced by the scan and the bins stored in memory 6, then a determination can be made that there is at least one object to be tidied in the room. This may in itself be sufficient for the controller 5 to issue an output alert for a maintenance operation, or the controller may be configured to implement one or more further algorithms to determine whether the bin mismatch was as a result of a transient presence or the presence of an inanimate object on the floor of the washroom that is to be tidied away.

The invention claimed is:

1. A waste bin comprising:
   a beam supply unit for supplying a beam to a surface of a washroom at a first location;
   a reflected beam detection unit to receive the beam when reflected from the surface of the washroom, or to receive the beam when reflected from at least one object in the path of the beam to the surface; and
   wherein the beam supply unit and the reflected beam detection unit are arranged at a bottom end of the waste bin and the beam supply unit is arranged to send the beam along a floor of the washroom to detect the presence of an object to be tidied, the at least one object in the path of the beam including the object to be tidied.

2. The waste bin of claim 1, wherein the beam supply unit is configured to send the beam parallel to the floor of the washroom to detect the presence of the object to be tidied.

3. The waste bin of claim 1, further comprising:
   a controller configured to (i) determine from a measured detection result from the reflected beam detection unit the presence of the object to be tidied based on a comparison of the measured detection result with a predetermined detection result previously obtained when the beam reflected from the surface at the first location, and to (ii) issue an object to be tidied output signal indicating that the object to be tidied is present based on the determination on the presence of the object to be tidied.

4. The waste bin of claim 3, wherein the controller is configured to determine data indicative of a distance of a travel path of the beam from the measured detection result of the reflected beam and to determine the presence of the object to be tidied on the basis of the determined data as compared to predetermined distance data on the travel path to the surface of the washroom at the first location.

5. The waste bin of claim 3, wherein the controller is configured to perform a calibration process to obtain data on a detection result to be expected when the beam reflects off of the surface of the washroom at the first location, wherein the controller is configured to store the detection result to be expected in a memory as the predetermined detection result, and the controller is configured to access the predetermined data for comparing to the current reflected beam detection result, which is the measured detection result, in determining whether the beam has reflected from the object to be tidied in the path of the beam to the washroom surface at the first location.

6. The waste bin of claim 3, wherein the controller is configured to require that a positive determination on the presence of at least one object to be tidied for at least two successive scans of the beam in the washroom be made before an output signal is issued indicating the presence of the object to be tidied in the washroom.

7. The waste bin of claim 3, wherein the controller is configured to perform a scan of the room to determine the presence of the object to be tidied more frequently in a detection mode than in a power save mode.

8. The waste bin of claim 7, wherein the controller is configured to switch between the power save mode and the detection mode in dependence on an input signal from an empty washroom sensor indicating when the washroom is empty.

9. A system comprising:
   the waste bin of claim 8; and
   the empty washroom sensor, wherein the empty washroom sensor comprises a movement sensor, a heat sensor for detecting presence of a guest's body heat, a light switch sensor, a light sensor and/or a door open/close sensor.

10. The waste bin of claim 1, wherein the beam supply unit and the reflected beam detection unit are embodied in a laser distance measurement device or an ultrasonic distance measurement device or other range finding technology.

11. The waste bin of claim 3, further comprising:
    a signal sending unit configured to wirelessly communicate with a user interface device, wherein the controller is configured to control the signal sending unit in response to the output signal indicating that the room requires tidying to the user interface device to alert the user of a maintenance requirement.

12. The waste bin of claim 1, wherein the waste bin comprises a calibration option that a user interfaces with to get the waste bin to perform a calibration scan when the washroom is tidy to gather predetermined data for when the beam reflects off of the surface at the first location for use as reference data in the comparison.

13. The waste bin of claim 1, further comprising:
    a waste receiving mouth at a top end of the waste bin.

14. The waste bin of claim 1, wherein the beam supply unit and the reflected beam detection unit are mounted to an underside of the waste bin and are configured to be spaced from the floor of the washroom.

15. The waste bin of claim 1, wherein the beam supply unit is configured to supply the beam out of a sidewall of the waste bin.

16. A washroom system arranged with the waste bin of claim 1, wherein the washroom system comprises a washroom having the waste bin located therein.

17. The washroom system of claim 16, wherein the washroom comprises a washroom floor, and wherein the waste bin is arranged for determining the presence of at least one object to be tidied located on the washroom floor, the at least one object to be tidied including the object to be tidied.

* * * * *